United States Patent
Kim

(10) Patent No.: US 9,575,164 B2
(45) Date of Patent: Feb. 21, 2017

(54) LIDAR SENSOR SYSTEM

(71) Applicant: Hyundai Mobis Co., Ltd., Seoul (KR)

(72) Inventor: Won Gyum Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/176,647

(22) Filed: Feb. 10, 2014

(65) Prior Publication Data

US 2015/0062555 A1 Mar. 5, 2015

(30) Foreign Application Priority Data

Sep. 4, 2013 (KR) .......................... 10-2013-0106046

(51) Int. Cl.
*G01S 7/499* (2006.01)
*G01S 17/87* (2006.01)
*G01S 17/93* (2006.01)

(52) U.S. Cl.
CPC ................ *G01S 7/499* (2013.01); *G01S 17/87* (2013.01); *G01S 17/936* (2013.01)

(58) Field of Classification Search
CPC ............ G01J 3/447; G01C 3/08; G01N 21/21; G01V 8/00; G01S 17/89
See application file for complete search history.

(56) References Cited

U.S. PATENT DOCUMENTS

| | | | |
|---|---|---|---|
| 5,224,109 A * | 6/1993 | Krasutsky | F41G 7/2213 372/33 |
| 2003/0227626 A1* | 12/2003 | Dobbs et al. | 356/407 |
| 2005/0278098 A1* | 12/2005 | Breed | B60R 21/0134 701/45 |
| 2010/0283837 A1* | 11/2010 | Oohchida | G06T 7/0075 348/47 |
| 2014/0146303 A1* | 5/2014 | Mitchell | G01S 17/08 356/5.01 |

FOREIGN PATENT DOCUMENTS

| | | |
|---|---|---|
| JP | 09-210682 A | 8/1997 |
| JP | 2013-160548 A | 8/2013 |

OTHER PUBLICATIONS

Korean Office Action issued on Aug. 29, 2014 in corresponding Korean Application No. 10-2013-0106046 (4 pages).
Korean Office Action issued on Apr. 27, 2015 in counterpart Korean Application No. 10-2013-0106046 (3 pages in Korean).

* cited by examiner

*Primary Examiner* — Luke Ratcliffe
(74) *Attorney, Agent, or Firm* — NSIP Law

(57) ABSTRACT

A LIDAR sensor system includes: a transmitting unit including one or more emitting units so as to transmit polarization lasers to an object; a receiving unit configured to receive reflection light reflected on the object; and a processing unit configured to sense the object from the reflection light, and the transmitting unit may include a first emitting unit emitting a first laser and a second emitting unit emitting a second laser having polarization light orthogonal to the first laser.

11 Claims, 3 Drawing Sheets

$$\therefore E_{out} = \overline{E}_{\#1} \cdot \overline{E}_{\#2} = \left|\overline{E}_{\#1}\right|\left|\overline{E}_{\#2}\right| \cos\theta$$

LIDAR SENSOR SYSTEM

CROSS-REFERENCE TO RELATED APPLICATION

This application claims priority to and the benefit of Korean Patent Application No. 10-2013-0106046 filed in the Korean Intellectual Property Office on Sep. 4, 2013, the entire contents of which are incorporated herein by reference.

TECHNICAL FIELD

The present invention relates to a processing, checking, and welding integral device for a nozzle, and more particularly, to a processing, checking, and welding integral device for a nozzle in which processing, checking, and welding can be made in the nozzle by one device.

BACKGROUND OF THE INVENTION

In recent years, a system has been developed, which senses a pedestrian in front of a vehicle, and warns a driver or automatically performs a braking control or a steering control to avoid a collision when a collision risk is present.

Such a vehicle front object sensing system is provided with a LIDAR sensor system that can sense a distance up to a target, a direction, a speed, a temperature, and a material of the target, and the like in order to sense the target around a vehicle, and the LIDAR sensor system emits a laser to the target and may receive information on the target through reflection light reflected on the target.

In the related art, the LIDAR sensor system is provided with a single laser emitting unit to receive the information on the target, but in recent years, a LIDAR sensor system has been researched and developed, which emits one or more lasers in order to accurately sense short-range and long-range targets of the vehicle.

However, when two lasers are emitted to the target and the reflection light reflected on the target is received, two lasers have the same polarization characteristic and thus interfere with each other.

Korean Patent Publication No. 2009-0021724 (Application date: Aug. 28, 2007) 2007.08.28)

SUMMARY OF THE INVENTION

The present invention has been made in an effort to provide a LIDAR sensor system that can minimize interference of reflection light by using two lasers having polarization characteristics which the two lasers are orthogonal to each other.

An exemplary embodiment of the present invention provides a LIDAR sensor system sensing an object around a vehicle in which two or more emitting units emit laser beams which do not interfere with each other to the object.

Herein, two or more emitting units may emit to the object polarization lasers which are orthogonal to each other not to interfere with each other.

Two or more emitting units may use lasers having different polarization characteristics in order to sense a long-range object and a short-range object.

The lasers having different characteristics may be a horizontally polarized laser and a vertically polarized laser.

The horizontally polarized laser and the vertically polarized laser reflected from the object may be respectively received to sense the object.

Another exemplary embodiment of the present invention provides a LIDAR sensor system including: a transmitting unit including one or more emitting units so as to transmit polarization lasers to an object; a receiving unit configured to receive reflection light reflected on the object; and a processing unit configured to sense the object from the reflection light, and the transmitting unit may include a first emitting unit emitting a first laser and a second emitting unit emitting a second laser having polarization light orthogonal to the first laser.

Herein, the transmitting unit may include a first emitting unit configured to emit a P-polarized (horizontally polarized) laser beam; and a second emitting unit configured to emit an S-polarized (vertically polarized) laser beam.

The first emitting unit may sense a long-range object with the P-polarized laser and the second emitting unit may sense a short-range object with the S-polarized laser.

The receiving unit may include first and second photo detectors receiving reflection light generated by reflecting the laser beams emitted from the first and second emitting units on an object, and the first photo detector may receive reflection light of the P-polarized laser beam and the second photo detector may receive reflection light of the S-polarized laser beam.

The receiving unit may include different polarization filters so that the first and second photo detectors selectively receive the laser reflection beams which are orthogonal to each other.

According to an exemplary embodiment of the present invention, a LIDAR sensor system receives information on a target by using two lasers having polarization characteristics in which the two lasers are orthogonal to each other simultaneously to avoid laser sensors from interfering in each other.

DETAILED DESCRIPTION OF THE EMBODIMENTS

Hereinafter, a LIDAR sensor system according to an exemplary embodiment of the present invention will be described in detail with reference to the accompanying drawings.

Figure 1:
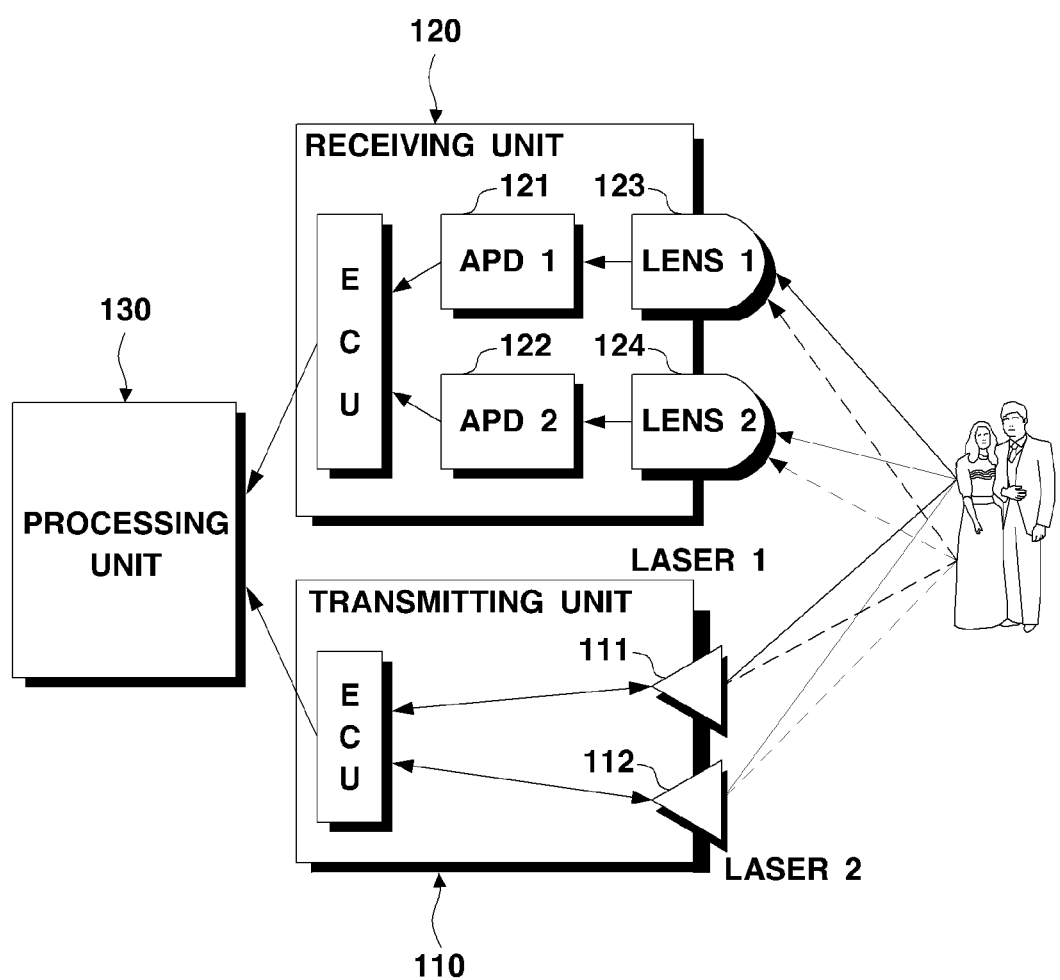
FIG. 1 is a schematic view of a LIDAR sensor system according to an exemplary embodiment of the present invention.

As illustrated in FIG. 1, a LIDAR sensor system 100 of the exemplary embodiment may include a transmitting unit 110 configured to transmit two lasers having polarization characteristics which the two lasers are orthogonal to each other, a receiving unit 120 configured to receive reflection light reflected on a target, and a processing unit 130 configured to sense the target the received reflection light through the receiving unit 120.

The transmitting unit 110 which transmits two lasers having the polarization characteristics which two lasers are orthogonal to each other includes a first emitting unit 111 and a second emitting unit 112, and the first emitting unit 111 and the second emitting unit 112 may emit lasers having polarized light beams which are orthogonal to each other.

The first emitting unit 111 and the second emitting unit 112 of the exemplary embodiment transmit the lasers having the polarization characteristics which the lasers are orthogonal to each other to the target to minimize interference of the reflection light received by the receiving unit 120 and the polarization characteristics of the lasers of the first emitting unit 111 and the second emitting unit 112 will be described below in more detail with reference to FIGS. 2 to 4.

The receiving unit 120 receives the reflection light reflected on the target, and may include first and second photo detectors 121 and 122, and first and second lenses 123 and 124 for converting emission light into parallel light may be provided in front of the first and second photo detectors 121 and 122.

In the exemplary embodiment, the first and second photo detectors 121 and 122 of the receiving unit 120 may include a separate polarization filter so as to selectively receive the lasers which are orthogonal to each other, which are emitted from the transmitting unit 110, and the first photo detector 121 may receive the reflection light of the laser of the first emitting unit 111 and the second photo detector 122 may receive the reflection light of the laser of the second emitting unit 112.

The processing unit 130 senses the target through the reflection light, and receives the reflection light emitted from the first emitting unit 111 and the second emitting unit 112 and reflected on the target to sense a distance up to the target, a direction, a speed, a temperature, and a material of the target, and the like.

Figure 2:
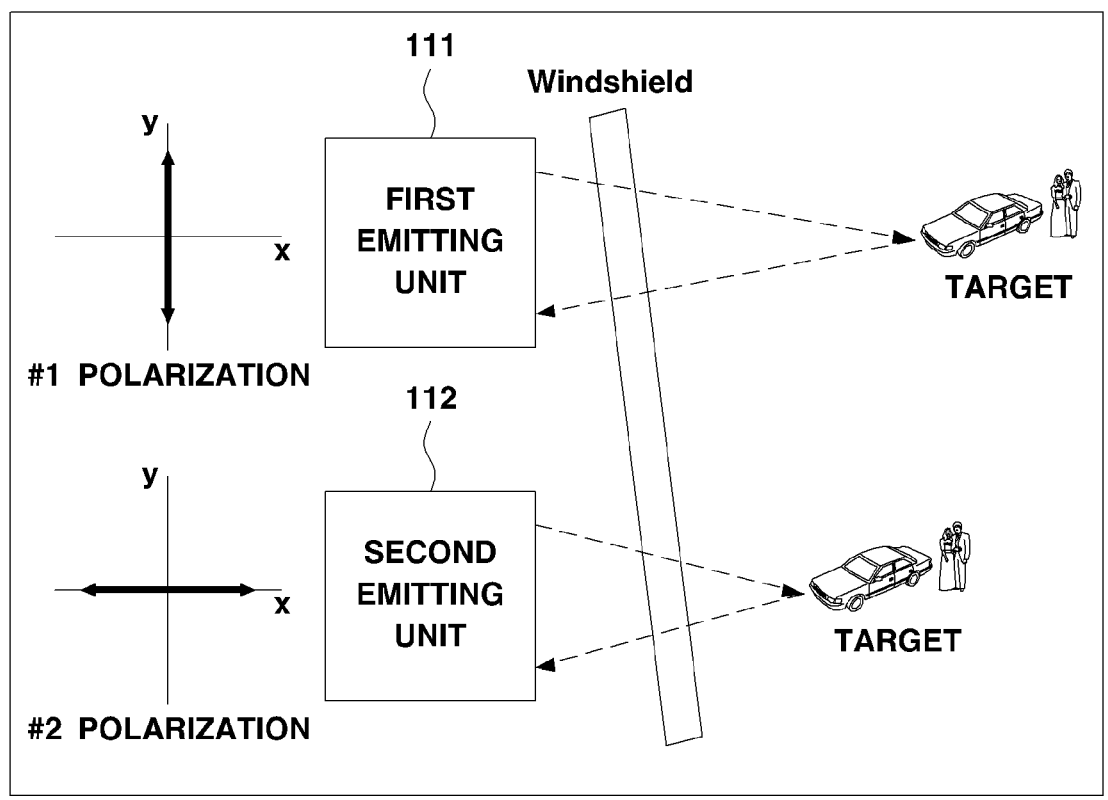
FIG. 2 is a schematic view of a transmitting unit of FIG. 1.
Figure 3:
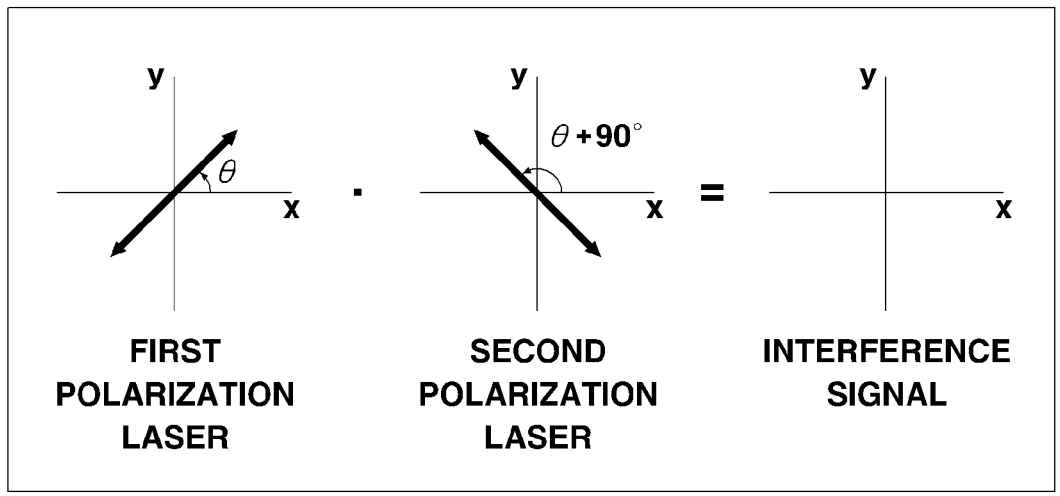
FIG. 3 is a schematic view illustrating laser polarization and interference of the transmitting unit of FIG. 1.

As illustrated in FIGS. 2 and 3, the LIDAR sensor system 100 of the exemplary embodiment includes the first emitting unit 111 and the second emitting unit 112 that transmit the lasers to the target in order to sense the target, and a first polarization laser of the first emitting unit 111 and a second polarization laser of the second emitting unit 112 may have linear polarization characteristics which the lasers are orthogonal to each other.

As illustrated in FIG. 3, interference between the LIDAR sensors is determined by the polarization characteristic of each laser, and an interference degree may be expressed by a product of an inner product of a polarization vector of the laser.

That is, the polarization lasers emitted from the first emitting unit 111 and the second emitting unit 112, respectively are orthogonal to each other by keeping an angle of 90° on XY coordinate axes to avoid the polarization lasers from interfering in each other.

That is, when two lasers having the polarization characteristics which the lasers are orthogonal to each other are used, the interference of the reflection light may be minimized in the LIDAR sensor system 100 of the exemplary embodiment, and in a combination of the polarization lasers, a P-polarized (horizontally polarized) laser and an S-polarized (vertically polarized) laser may be combined with each other.

Referring to FIG. 1, in the exemplary embodiment, the first emitting unit 111 and the second emitting unit 112 have polarization light beams which are orthogonal to each other to detect a long-range obstacle and a short-range obstacle. In detail, the first emitting unit 111 for detecting the long-range obstacle may emit a P-polarized (horizontally polarized) laser beam having low transmission loss to a front windshield of the vehicle and the second emitting unit 112 for detecting the short-range obstacle may emit an S-polarized (vertically polarized) laser beam.

As described above, although the LIDAR sensor system of the present invention has been described with reference to the exemplary embodiments of the present invention, the scope of the present invention is not limited to the aforementioned exemplary embodiments and it is apparent to those skilled in the art that modifications, changes, and various modified exemplary embodiments can be made without departing from the spirit of the present invention.

What is claimed is:

1. A LIDAR sensor system configured to sense a first object and a second object around a vehicle, the LIDAR sensor system comprising:
   a first emitting unit configured to emit a first laser beam to the first object; and
   a second emitting unit configured to emit a second laser beam to the second object;
   wherein the laser beams do not interfere with each other, and
   wherein the first emitting unit and the second emitting unit transmit the first laser beam and the second laser beam to the first object and second object, respectively, as polarized beams which are orthogonally polarized with respect to each other.

2. The system of claim 1, wherein:
   the polarized beams comprise different polarizations corresponding to sensing of a long-range object and a short-range object.

3. The system of claim 2, wherein the different polarizations comprise horizontal and vertical polarizations.

4. The system of claim 3, wherein respective reflections of the horizontally and vertically polarized laser beams are separately received to sense the first object and the second object.

5. A LIDAR sensor system, comprising:
   a transmitting unit comprising a first emitting unit configured to emit a first laser beam to a first object and a second emitting unit configured to emit a second laser beam to a second object;
   a receiving unit comprising a first photo detector configured to receive a first reflection light generated by a reflection of the first laser beam and a second photo detector configured to receive a second reflection light generated by a reflection of the second laser beam; and
   a processing unit configured to sense the first object based on the first reflection light and sense the second object based on the second reflection light,
   wherein the first laser beam comprises polarized light orthogonally polarized to polarized light of the second laser beam.

6. The system of claim 5, wherein:
   the first emitting unit is configured to emit the first laser beam as a P-polarized (horizontally polarized) laser beam; and
   the second emitting unit is configured to emit the second laser beam as an S-polarized (vertically polarized) laser beam.

7. The system of claim 6, wherein the processing unit is configured to sense a long-range object based on a reflection of the P-polarized laser beam and sense a short-range object based on a reflection of the S-polarized laser.

8. The system of claim 7, wherein the receiving unit comprises first and second photo detectors configured to receive reflection light generated by the reflection of the laser beams from the long-range object and the short-range object, and the first photo detector is configured to receive a reflection light of the P-polarized laser beam and the second photo detector is configured to receive a reflection light of the S-polarized laser beam.

9. The system of claim 8, wherein the first and second photo detectors comprise different polarization filters.

10. The system of claim 5, wherein the receiving unit further comprises:
- a first lens configured convert the first reflection light into parallel light; and
- a second lens configured to convert the second reflection light into parallel light.

11. A LIDAR sensor system, comprising:
- a first emitting unit configured to emit a P-polarized laser beam to a long-range object;
- a second emitting unit configured to emit a S-polarized laser beam to a short-range object;
- a first photo detector configured to receive a first reflection light generated by a reflection of the P-polarized laser beam;
- a second photo detector configured to receive a second reflection light generated by a reflection of the S-polarized laser beam; and
- a processing unit configured to sense the long-range object based on the first reflection light and sense the short-range object based on the second reflection light.

* * * * *